United States Patent [19]

Primdahl

[11] Patent Number: 5,554,351
[45] Date of Patent: Sep. 10, 1996

[54] HIGH TEMPERATURE STEAM REFORMING

[75] Inventor: Ivar I. Primdahl, Copenhagen, Denmark

[73] Assignee: Haldor Topsoe A/S, Denmark

[21] Appl. No.: 243,689

[22] Filed: May 17, 1994

[30] Foreign Application Priority Data

May 17, 1993 [DK] Denmark ................. 0576/93

[51] Int. Cl.6 ................. C01B 3/34; C01B 3/40; B01J 8/04
[52] U.S. Cl. ................. 423/245.3; 423/418.2; 423/652; 423/653; 423/654; 48/198.3
[58] Field of Search ................. 423/654, 653, 423/652, 651, 245.3, 418.2; 252/373; 48/198.3

[56] References Cited

U.S. PATENT DOCUMENTS

| 2,056,911 | 10/1936 | Schiller, et al. | 423/654 |
| 2,665,979 | 1/1954 | Taussig, Jr. | 423/651 |
| 2,668,101 | 2/1954 | Arnold et al. | 48/196 |
| 2,760,917 | 8/1956 | Ward | 423/651 |
| 2,801,159 | 7/1957 | Carton et al. | 423/651 |
| 4,207,211 | 6/1980 | Russ et al. | 252/466 J |
| 4,654,458 | 3/1987 | Jezl et al. | 585/500 |

FOREIGN PATENT DOCUMENTS

| 16133 | 7/1986 | Japan . | |
| 725285 | 3/1955 | United Kingdom | 252/373 |

OTHER PUBLICATIONS

"Basic College Chemistry" 2nd ed.; by Joseph E Babor, Apr. 1953 Thomas Crowell Company–New York p. 256.

*Primary Examiner*—Gary P. Straub
*Assistant Examiner*—Timothy C. Vanoy
*Attorney, Agent, or Firm*—Ostrolenk, Faber, Gerb & Soffen, LLP

[57] ABSTRACT

Process for the high temperature steam reforming of hydrocarbons in the presence of a steam reforming catalyst arranged as fixed bed in a reforming reactor, wherein the catalyst bed comprises at least an upper and a lower layer, the upper layer being provided with catalyst particles having reduced activity in the steam reforming of hydrocarbons.

8 Claims, No Drawings

HIGH TEMPERATURE STEAM REFORMING

BACKGROUND OF THE INVENTION

The present invention is directed to the preparation of hydrogen and carbon monoxide rich gas. In particular, the invention relates to a process and reactor for the preparation of such gas by high temperature catalytic steam reforming of a hydrocarbon feedstock.

Hydrogen and carbon monoxide rich gases are used as synthesis gas mainly in the production of ammonia and methanol, furthermore, during steel production and as fuel or town gas.

Industrial preparation methods presently comprise high temperature steam reforming processes, like autothermal catalytic reforming or primary and secondary steam reforming of hydrocarbons.

At high temperature steam reforming processes a hydrocarbon feedstock is combusted together with air, oxygen, or oxygen enriched air in a burner mounted at the top of a reaction vessel. Oxygen is, thereby, supplied in amounts, which are less than the amount required for complete combustion and hydrogen and carbon monoxide are produced in an effluent gas mainly by flame reactions:

$$C_n H_m + n/2\, O_2 \rightarrow n\, CO + m/2\, H_2 \quad (1)$$

$$C_n H_m + n\, O_2 \rightarrow n\, CO_2 + m/2\, H_2 \quad (2)$$

which are strongly exothermic for all hydrocarbons. This process is most usually used in the reforming of lighter feedstocks ranging from natural gas to naphtha fractions with a boiling point up to 200° C.

During the process only a part of the hydrocarbon feedstock is oxidized with an oxygen containing atmosphere by the above flame reactions (1,2). Residual hydrocarbons in the gas stream from the combustion are then catalytically steam reformed by the endothermic reaction:

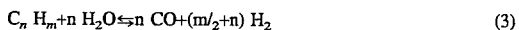

$$C_n H_m + n\, H_2O \rightleftharpoons n\, CO + (m/2 + n)\, H_2 \quad (3)$$

The catalytic steam reforming process is accomplished at temperatures of about 900°–1400° C. Steam is added to the feed in order to moderate the flame temperature and increase hydrocarbon conversion in the burner effluent gas.

The hydrocarbon feed mixed with steam is burnt with an oxygen containing atmosphere in the upper portion of a reactor. Residual hydrocarbons in the combusted gas are then steam reformed in the presence of a catalyst arranged as fixed bed in a lower portion of the reactor. Heat for the endothermic steam reforming reactions is supplied by the hot effluent gas from the combustion zone in the upper reactor portion and above the catalyst bed. As the combustion gas contacts the catalyst, the temperature in the gas cools to 900°–1100° C. by the steam reforming reactions in the catalyst bed.

In order to withstand the high temperatures arising during the exothermic flame reaction (1,2), the reactor shell is protected by temperature resistant and insulating refractory lining material on the inner wall of the shell.

Presently, lining materials most commonly used in industrial reactors of the above types contain more than 90% alumina. Although these materials are high-strength castables or bricks with good heat and wear-resistant properties, deterioration by contact with hot combustion gases containing carbon oxides, steam and hydrogen occur most severely in the upper reactor portion surrounding the combustion zone. Due to the reducing nature of the gases alumina in the refractory material is reduced to suboxides of aluminum, which are volatile in the high temperature environment in the reactor upper portion.

Volatile degradation products from the reactor lining together with impurities, which are contained in the feedgas and are volatile at high temperatures, precipitate in parts of the reactor and downstream reaction equipment being at temperatures below the evaporation temperature of the degradation products and impurities.

In reactors being provided with a bed of highly active steam reforming catalyst, the temperature at the catalyst surface in the upper portion of the bed is, thereby, considerable lower than the temperature of the combustion gas traversing it and deposition of solids takes place typically in the uppermost layers of the catalyst bed.

Deposition of solids is, therefore, concentrated substantially to a thin layer in the uppermost portion of the catalyst bed and causes restriction of gas passage in this layer leading to heterogeneous flow distribution in subjacent layers of the bed and eventually to detrimental channelling through the catalyst bed.

SUMMARY OF THE INVENTION

It has now been found that the above problems arising during high temperature catalytic steam reforming processes may be avoided when providing the uppermost layer of the catalyst bed with catalyst particles having a reduced activity in the steam reforming of hydrocarbons and increasing the activity of the catalyst particles gradually in the succeeding layers. The temperature drop i.e., the temperature difference between the gas traversing the catalyst bed and the catalyst surface due to the endothermic steam reforming reaction proceeding in the catalyst bed will be smoothed over a larger area resulting in minor deposition of solids in the uppermost part of the bed. Solid deposition is, thereby, distributed over a larvae area within the catalyst bed and gas passage in the catalyst bed much improved.

Pursuant to this findings, this invention provides an improved process for the high temperature steam reforming of hydrocarbons in the presence of a steam reforming catalyst arranged as fixed bed in a reforming reactor, wherein the catalyst bed comprises at least an upper and a lower layer, the upper layer being provided with catalyst particles having a reduced activity in the steam reforming of hydrocarbons.

DESCRIPTION OF THE PREFERRED EMBODIMENTS

In operating the inventive process and reactor, a hydrocarbon feedstock preheated to about 400°–700° C. is introduced into a burner mounted at the top of a refractory lined reactor. In the burner, the feedstock is mixed with steam and oxygen containing atmosphere. The amount of oxygen corresponds to an oxygen/carbon mole ratio of preferably between 0.5 and 0.7 and a steam/carbon mole ratio of preferably between 0.5 and 2.0. Typical hydrocarbon feedstocks suited for the process will range from methane to naphtha fractions with a boiling point up to 200° C., including natural gas, LPG and primary reformed gas, when operating the process under autothermal catalytic reforming conditions.

The effluent gas from the burner containing unconverted hydrocarbons is then passed through the steam reforming catalyst arranged as fixed bed below the burner combustion zone in the reforming reactor.

At a temperature of 1000°–1500° C., which is usually prevailing in the combustion zone, degradation products from the reactor lining, the burner or extraneous components in the process feedgas are volatile and carried in the effluent gas to the catalyst bed.

Due to the endothermic steam reforming of residual hydrocarbon in the effluent gas on the catalyst, the catalyst surface in the upper layer of the bed is typically about 100°–150° C. lower than the temperature in the surrounding gas by use of catalysts with conventional steam reforming activity like the known nickel and/or molybdenum containing catalysts. When reducing the activity of conventional steam reforming catalysts to e.g. 5%, the temperature drop in the upper catalyst layer is limited to about 25° C. As a result, deposition of solid compounds on the catalyst surface is distributed over a larger area in the bed as the temperature variation on the catalyst surface are smoothed in the upper layer of the catalyst bed.

As apparent from the Table 2 below, the surface temperature in the catalyst bed can be controlled at a given gas composition (Table 1) within a large temperature interval. The desired catalyst surface temperature will, thereby, depend on the volatility of solids in the effluent gas.

TABLE 1

| Gas Composition | | Inlet Cat. | Exit Cat. |
|---|---|---|---|
| $H_2$ | Dry mole % | 56.7 | 62.4 |
| $N_2$ | Dry mole % | 7.0 | 6.1 |
| CO | Dry mole % | 21.4 | 21.5 |
| $CO_2$ | Dry mole % | 8.3 | 8.3 |
| $CH_4$ | Dry mole % | 5.7 | 0.94 |
| Ar | Dry mole % | 0.91 | 0.79 |
| $H_2O$ | Dry mole % | 33.9 | 28.2 |

TABLE 2

Autothermal Reforming.
Temperature Profile - Catalyst Bed:
Nickel reforming Catalyst RKS-2,
Supplied by Haldor Tops+e,sez o+ee e A/S, Denmark.

| Rel. Activity Axial Distance (m) | 100% Temperature | | 30% Temperature | | 10% Temperature | |
|---|---|---|---|---|---|---|
| Catalyst Bed | Gas | Cat. | Gas | Cat. | Gas | Cat. |
| 0.00 | 1150 | 1089 | 1150 | 1109 | 1150 | 1127 |
| 0.02 | 1106 | 1062 | 1119 | 1086 | 1132 | 1112 |
| 0.10 | 1020 | 1008 | 1045 | 1031 | 1078 | 1067 |
| 0.20 | 992 | 989 | 1007 | 1002 | 1040 | 1034 |
| 0.30 | 985 | 985 | 993 | 991 | 1018 | 1014 |
| 0.40 | 984 | 983 | 987 | 986 | 1005 | 1003 |
| 0.60 | 983 | 983 | 984 | 984 | 992 | 991 |

An activity reduction of 90% of the activity of conventional reforming catalyst in an upper layer of 30 to 60 cm of the catalyst bed will, in industrial high temperature reforming reactors, usually be sufficient to disperse deposition of solids in the upper portion of the catalyst bed to such an extent that detrimental restriction of gas passage is avoided.

Further distribution of solid deposition in the lower layers of the catalyst bed may be obtained through dividing the layers into a number of sublayers provided with increasing catalyst activity in flow direction of the reacting gas.

Catalysts with reduced reforming activity may be prepared by impregnation of a suitable carrier with reduced amounts of active material or leaching a part of the active material from impregnated catalyst particles.

Reduced catalytic activity may, furthermore, be obtained through increasing the particle size of the catalyst in the upper layer of the catalyst bed.

I claim:

1. A process for the steam reformation of hydrocarbons, comprising the steps:

i) partially combusting a hydrocarbon feedstock, steam and an oxygen containing gas stream in a burner reactor in which the inside wall of the burner reactor is lined with an alumina containing insulating refractory material which forms volatile degradation products during the combustion process;

ii) passing the resulting partially combusted effluent containing the alumina based volatile degradation products to a steam reforming catalyst for the steam reformation of the residual hydrocarbon molecules within said partially combusted effluent, the improvement comprising:

arranging said steam reforming catalyst into first and second layers wherein the first layer has a lower catalytic activity than the second layer so as to minimize intensity of deposition of the aluminum based degradation products on the first layer of the catalyst bed which is the portion of the catalyst bed that is first contacted by the partially combusted effluent, thereby reducing plugging of the catalyst bed with the aluminum containing degradation products.

2. The process of claim 1, wherein the activity of the catalyst particles in the first layer of the catalyst bed is between 1 and 50% of the activity of the catalyst particles in the second layer of the bed.

3. The process of claim 1, wherein the first layer of the catalyst bed has a thickness of between 0.30 and 0.60 meters and the activity of the catalyst particles in the first layer of the catalyst bed is about 10% of the activity of the catalyst particles in the second layer of the bed.

4. The process of claim 1, wherein the second layer of the catalyst bed comprises a number of sublayers being successively provided with catalyst particles having increasing steam reforming activity.

5. The process of claim 1 wherein the composition of said hydrocarbon feed stock can vary from methane to naphtha fractions with a boiling point up to 200° C. and said steam reforming catalyst is selected from the group consisting of nickel and molybdenum containing catalysts.

6. The process of claim 5 wherein said hydrocarbon feed stock is selected from the group consisting of natural gas, LPG and primary reformer gas.

7. The process of claim 1 wherein the catalyst particles of said first layer contain smaller amounts of active catalytic material than the catalyst particles of said second layer.

8. The process of claim 1 wherein the catalyst particles of said first layer are larger than the catalyst particles of said second layer.

* * * * *